US008239379B2

(12) United States Patent
Chidlovskii et al.

(10) Patent No.: US 8,239,379 B2
(45) Date of Patent: Aug. 7, 2012

(54) SEMI-SUPERVISED VISUAL CLUSTERING

(75) Inventors: Boris Chidlovskii, Meylan (FR); Loic Lecerf, Biviers (FR)

(73) Assignee: Xerox Corporation, Norwalk, CT (US)

( * ) Notice: Subject to any disclaimer, the term of this patent is extended or adjusted under 35 U.S.C. 154(b) by 1424 days.

(21) Appl. No.: 11/827,770

(22) Filed: Jul. 13, 2007

(65) Prior Publication Data

US 2009/0018995 A1    Jan. 15, 2009

(51) Int. Cl.
*G06F 7/00* (2006.01)
*G06F 17/30* (2006.01)

(52) U.S. Cl. ........................ 707/724; 707/737
(58) Field of Classification Search ........... 707/999.002, 707/724, 737
See application file for complete search history.

(56) References Cited

U.S. PATENT DOCUMENTS

| | | | |
|---|---|---|---|
| 6,347,313 B1 * | 2/2002 | Ma et al. ....................... | 707/711 |
| 6,380,937 B1 | 4/2002 | Dong et al. | |
| 6,562,077 B2 | 5/2003 | Bobrow et al. | |
| 6,728,932 B1 | 4/2004 | Chundi et al. | |
| 2002/0171646 A1 * | 11/2002 | Kandogan ..................... | 345/440 |
| 2004/0193633 A1 * | 9/2004 | Petculescu et al. ..... | 707/999.101 |
| 2005/0283488 A1 * | 12/2005 | Colossi et al. ............. | 707/999.1 |
| 2006/0036399 A1 * | 2/2006 | Yang et al. .................... | 702/181 |

OTHER PUBLICATIONS

Yu et al., "Efficient Feature Selection via Analysis of Relevance and Redundancy," Journal of Machine Learning Research 5, pp. 1205-1224, 2004.
Basu et al., "A Probabilistic Framework for Semi-Supervised Clustering," Proceedings of the Tenth aCM SIGKDD Internaitonal Conference on Knowledge Discovery and Data Mining (KDD-2004), pp. 59-68, Seattle, WA, Aug. 2004.
Kandogan, "Visualizing Multi-dimensional Clusters, Trends, and Outliers Using star Coordinates," KDD'01: Proc. $7^{th}$ ACM SIGKDD Intern. Conf. on Knowledge Discovery and Data Mining, pp. 107-116 (ACM Press, New York, NY) 2001.
Chidlovskii et al., "ALDAI: Active Learning Documents Annotation Interface," pp. 2, 2005.
Chen et al., "iVIBRATE: Interactive Visualization-Based Framework for Clustering Large Datasets," ACM Transactions on Information Systems, vol. 24, No. 2, pp. 245-294, Apr. 2006.

* cited by examiner

*Primary Examiner* — Etienne Leroux
*Assistant Examiner* — Bryan Walker
(74) *Attorney, Agent, or Firm* — Fay Sharpe LLP

(57) ABSTRACT

A clustering system includes a visual mapping sub-system configured to display an N-dimensional to two- or three-dimensional mapping of items to be clustered, where N is greater than three, the mapping having mapping parameters for the N-dimensions. A user interface sub-system is configured to receive user inputted values for the mapping parameters, user inputted values selecting whether selected mapping parameters are fixed or adjustable, and user inputted values associating selected items with selected groups. An adjustment sub-system is configured to adjust the adjustable mapping parameters, without adjusting any fixed mapping parameters, to improve a measure of distinctness of one or more groups of items in the two- or three-dimensional mapping.

18 Claims, 3 Drawing Sheets

SEMI-SUPERVISED VISUAL CLUSTERING

BACKGROUND

The following relates to the information technology arts, and more particularly to the clustering, categorization, and related arts.

Clustering of items is a typical task in information technology. The term "item" in various applications may refer to documents, images, data entries, musical files or content, video files or content with or without soundtracks, Internet URL's, content of a local area network (LAN), hard drive, or other storage medium, or so forth. Each item is characterized by a plurality of dimensions of information, where each dimension refers to an aspect descriptive of items to be grouped. In one approach, the items to be grouped can be represented in a table-like form in which the rows correspond to individual items, and the columns correspond to dimensions (or vice versa). In semi-supervised or supervised clustering (the latter sometimes being referred to as categorization), some or all items may have a class or group label or annotation. Clustering algorithms typically assign items to groups of "like items" based on some indication of similarity. A dataset can be large in terms of the number of items, the number of dimensions, or both.

Existing algorithms for automated clustering include K-Mean and its variants, Principal Component Analysis, Fisher Discriminant Analysis, and so forth. Existing automated clustering algorithms are less robust than would ideally be desirable, and sometimes produce deficient results for irregularly shaped groupings or other arbitrarily shaped groupings. User interaction in existing automated clustering algorithms is also limited, typically to user selection of the initial conditions. If the automated clustering algorithm produces a deficient result, the user's only option may be to restart the automated clustering from the beginning using different initial conditions.

In view of these difficulties, manual clustering is sometimes used. Manual clustering by a human actor has the disadvantage of being labor-intensive, and the quality of the results are heavily dependent upon the skill and effort of the human actor. Generally, it is difficult for a human actor to sort through a large number of items having a large number of dimensions in order to identify useful groupings.

A third approach is interactive visual clustering. In these approaches, the N-dimensional collection of items (where N is the number of dimensions used in characterizing the items) is mapped to a two- or three-dimensional space that is more easily visualized by a human actor. The mapping employs mapping parameters that can be adjusted by the human actor in order to produce visually perceptible groupings of items in the two- or three-dimensional mapping. An example of this approach is the star coordinate visual clustering method, in which each dimension is mapped to a two-dimensional mapping space using mapping parameters including a selected angle (denoted by $\theta$) and unit length (denoted by $\alpha$). An item P in the N-dimensional space having dimensional values ($x_{1p}$, $x_{2p}$, ..., $x_{Np}$) is mapped to a point Q(x,y) in the two-dimensional star coordinate space by starting at an origin in the two-dimensional star coordinate space and summing vectors of the form $[(\alpha_i \cdot x_{ip} \cdot \cos(\theta_i)), (\alpha_i \cdot x_{ip} \cdot \sin(\theta_i))]^T$, where $\theta_i$ and $\alpha_i$ are the mapping parameters for the i-th dimension, $x_{ip}$ is the value of the i-th dimension of the item P, and the vector sum is over i=[1, ..., N] for N dimensions.

Interactive visual clustering provides a mechanism to assist the human actor in identifying suitable groupings of items. For example, in the star coordinate visualization, two dimensions that have about the same angular $\theta$ values will generally be aggregated together. On the other hand, adjusting the $\alpha$ value controls the contribution to the visualization of the corresponding dimension. Items of a candidate group can be denoted by a characteristic color or shape to enable visual tracking of the candidate group as changes are made in the $\theta$ and $\alpha$ parameters.

Interactive visual clustering is an aid to manual clustering, and accordingly retains the same deficiencies. The approach remains labor-intensive, and the quality of the results remains dependent upon the skill and effort of the human actor. The interactive visualization assists the human actor in sorting through the items to identify useful groupings. However, it is still difficult for the human actor to deal with a large number of items, dimensions, or both, even with the assistance of interactive visual clustering. Linkages between $\theta$ and $\alpha$ parameters of the visualization and the dimensions of the items may be difficult to grasp. Thus, it may not be apparent to the human actor how best to adjust the mapping parameters to make a particular group manifest in the visualization.

BRIEF DESCRIPTION

In some illustrative embodiments disclosed as illustrative examples herein, a storage medium or storage media stores software including: visual mapping software executable to display an N-dimensional to two- or three-dimensional mapping of items to be clustered, where N is greater than three, the mapping having mapping parameters for the N-dimensions; and automated adjustment software configured to automatically adjust at least some mapping parameters to improve a measure of distinctness of one or more groups of items in the two- or three-dimensional mapping.

In some illustrative embodiments disclosed as illustrative examples herein, a clustering system comprises: a visual mapping sub-system configured to display an N-dimensional to two- or three-dimensional mapping of items to be clustered, where N is greater than three, the mapping having mapping parameters for the N-dimensions; a user interface sub-system configured to receive user inputted values for the mapping parameters, user inputted values selecting whether selected mapping parameters are fixed or adjustable, and user inputted values associating selected items with selected groups; and an adjustment sub-system configured to adjust the adjustable mapping parameters, without adjusting any fixed mapping parameters, to improve a measure of distinctness of one or more groups of items in the two- or three-dimensional mapping.

In some illustrative embodiments disclosed as illustrative examples herein, a clustering method comprises: displaying an N-dimensional to two- or three-dimensional mapping of items to be clustered, where N is greater than three; grouping selected items of the items to be clustered to define one or more groups of items; applying an automated adjustment algorithm to adjust at least one mapping parameter to improve a measure of distinctness of the one or more groups of items in the two- or three-dimensional mapping; and displaying an updated N-dimensional to two- or three-dimensional mapping of items to be clustered using the adjusted mapping parameters.

DETAILED DESCRIPTION

Figure 1:
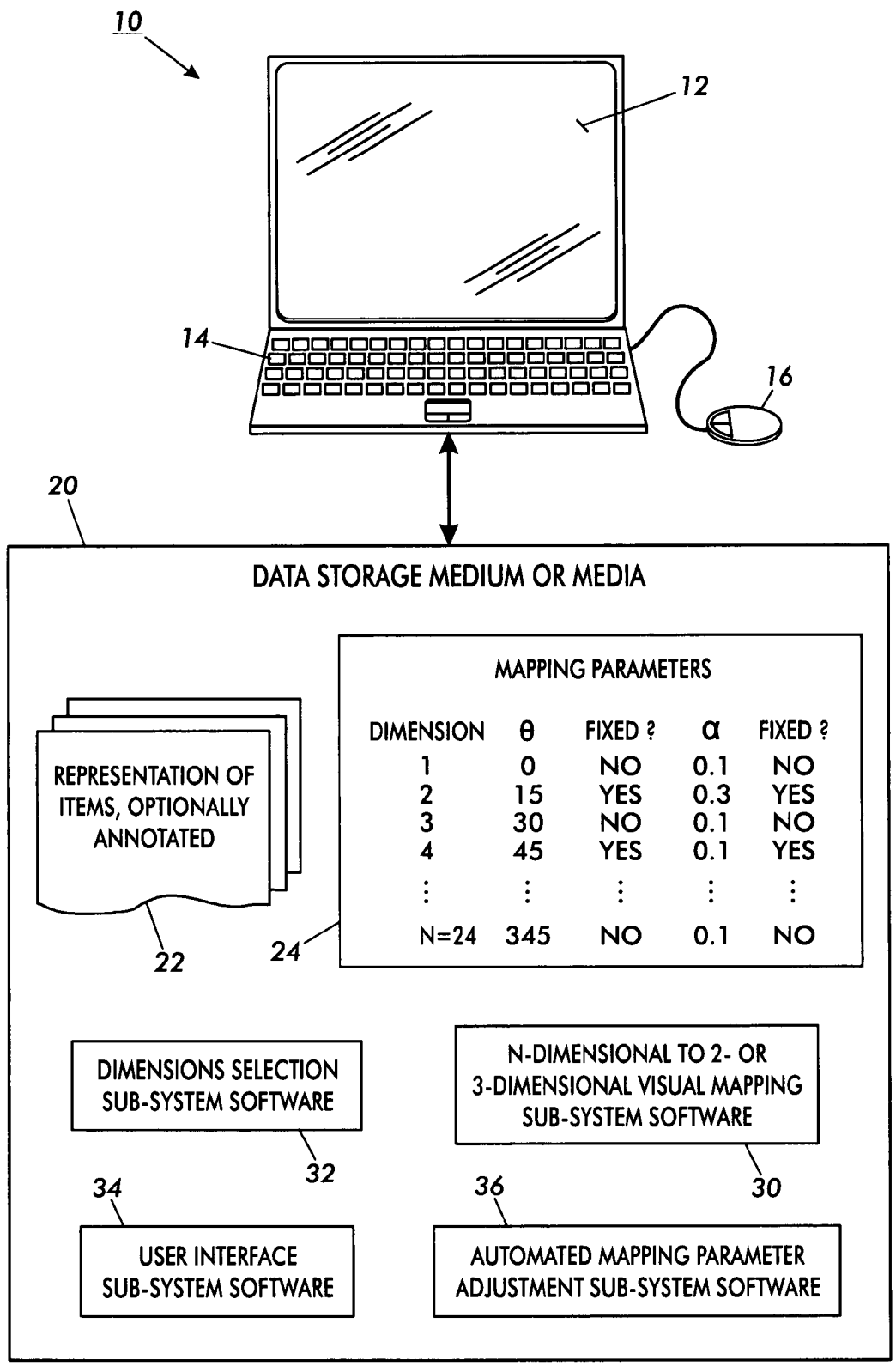
FIG. 1 diagrammatically shows a clustering system.

With reference to FIG. 1, a clustering system includes a computer 10 with at least one processor, a graphical display 12, user input devices including a keyboard 14 and a mouse 16, and one or more storage media 20, the latter being diagrammatically depicted in FIG. 1. The at least one processor of the computer 10 is not shown in FIG. 1. Some suitable processors include single-core, dual-core, quad-core or otherwise configured microprocessors, microcontrollers, and so forth. The illustrated graphical display 12 can be a liquid crystal display (LCD), a plasma display, a cathode ray tube (CRT) display, a projection display, or so forth. The user input devices 14, 16 are illustrative examples, and can be supplemented or replaced by other user input devices such as a membrane keypad, trackball, touchpad, voice-recognition input, or so forth.

The one or more storage media 20 can include random access memory (RAM), read-only memory (ROM), a hard disk, optical disk, or so forth. The one or more storage media 20 store data, including a representation of items 22 to be clustered and mapping parameters 24. The representation of items 22 can take substantially any format, including for example a tabular representation in which rows (or columns) represent the items and columns (or rows) represent the dimensions. The representation of items 22 can take the form of a relational database table, a spreadsheet table, or so forth. The items themselves may or may not be stored on the storage medium or media 20. For example, in some embodiments the items may be files that are stored on a hard disk, and the representation of items 22 is an index of items also stored on the hard disk. In other embodiments, the items may be websites represented by URL addresses, and the storage medium or media 20 is a search engine server that does not itself store the websites. In some embodiments, the representation of items 22 is also contemplated to comprise the items themselves, with the values of the various dimensions being computed from the items when used, or with the values of the various dimensions being annotated or otherwise associated with the items. The representation of items 22 may in some places herein be referred to more compactly as the items 22; however, it is to be understood that it is sufficient to store a representation of the items and to store or be able to readily derive values of the dimensions for each item. The items 22 may be partially or wholly annotated with group identifications or labels. In a typical approach, the items 22 are initially unlabeled or only a few items are labeled. As the clustering progresses, additional labels are added and validated to determine labeling that clusters the items 22 into groups having similarities such as similar values for certain dimensions of interest. The annotations are suitably stored in a column of a tabular representation of items. If the representation of items comprises the items themselves, then the items themselves can be annotated with group labels.

The mapping parameters 24 are accessed and used by an N-dimensional to two- or three-dimensional visual mapping sub-system software 30. The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth.

The terms "system" and "sub-system" as used herein is intended to encompass systems and sub-systems embodied purely as hardware, for example an analog, digital, or mixed application-specific integrated circuit (ASIC), systems embodied as a combination of hardware such as a computer or other digital device and software executable on said hardware, such as the system illustrated in FIG. 1, or a combination of such systems or sub-systems. Thus, for example, the computer 10 and the visual mapping sub-system software 30 that can execute on the computer 10 together define a visual mapping sub-system. Moreover, the phrase "storage medium storing software executable to perform" a function as used herein is intended to encompass any storage medium that stores software that is executable on a computer or other digital device to perform said function. Examples of suitable storage media include RAM, ROM, a hard disk, an optical disk, a web-based server, or so forth.

The illustrative clustering system of FIG. 1 includes other sub-systems for performing other clustering tasks. A dimensions selection sub-system is embodied in the illustrative example as the computer 10 together with dimensions selection sub-system software 32. A dimensions selection sub-system is embodied in the illustrative example as the computer 10 together with dimensions selection sub-system software 32. A user interface sub-system is embodied in the illustrative example as the computer 10 together with user interface sub-system software 34. An automated mapping parameter adjustment sub-system is embodied in the illustrative example as the computer 10 together with automated mapping parameter adjustment sub-system software 36. In other embodiments, the clustering system may include additional or other sub-systems, and various sub-systems can be variously integrated or organized. Moreover, certain sub-systems may be omitted in some embodiments. For example, the dimensions selection sub-system may be omitted, in which case all dimensions of the items are used in the clustering, or those dimensions selected by the user via the user interface sub-system are used in the clustering.

In the clustering system of FIG. 1 illustrated herein as an example, the visual mapping sub-system is configured to display on the display 12 an N-dimensional to two-dimensional star coordinate mapping of the items 22 to be clustered, where N is greater than three, the mapping having the illustrated $\theta$ and $\alpha$ star coordinate mapping parameters 24 for the N dimensions. In illustrative FIG. 1, the mapping parameters 24 are diagrammatically shown as a table having N rows corresponding to the N dimensions, and five columns: (i) a dimension index running from 1 to N; (ii) a value for the $\theta$ mapping parameter specified in degrees; (iii) a boolean parameter indicating whether the $\theta$ mapping parameter is fixed (the other option being adjustable); (iv) a value for the a mapping parameter; and (v) a boolean parameter indicating whether the a mapping parameter is fixed. In other embodiments, other visual mapping sub-systems may be employed, such as an elliptical three-dimensional mapping sub-system where, for example, the mapping parameters may comprise spherical coordinates including a translational scaling parameter a (corresponding to the a parameter of the star coordinates mapping sub-system) and two angular parameters $\theta$ and $\phi$. The visual mapping sub-system software 30 includes code sufficient to enable a graphical rendering of the two- or three-dimensional mapping on the display 12, typically using symbols such as filled or unfilled circles, squares, or so forth to represent individual items. In the case of a three-dimensional mapping, the displayed mapping can include a three-dimensional rendering and optionally user-selected slices through the three-dimensional rendering space. The displayed mapping optionally includes other representations of portions of the mapping such as a plot of density of items versus position along a projection or line through the mapping, or so forth. In some embodiments, the code sufficient to enable a graphical rendering of the two- or three-dimensional mapping may include calls to dynamic link libraries (DLLs) or other system-level software to perform certain functions such as rasterization of the mapping display or so forth. More generally, any of the software 30, 32, 34, 36 may invoke system-level code or calls to other software residing on a server or other location to perform certain functions.

Figure 2:
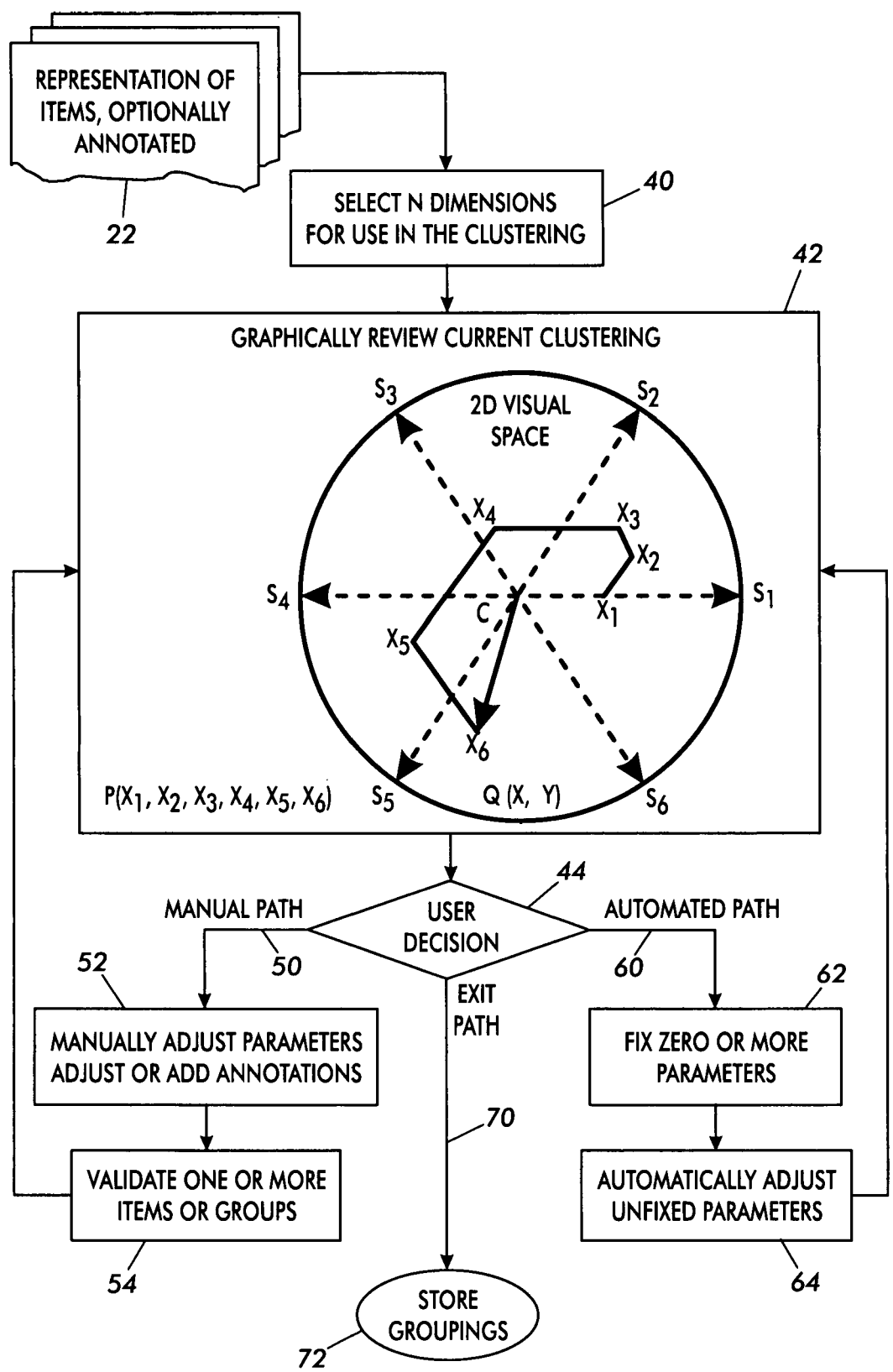
FIG. 2 diagrammatically shows a clustering method implemented using the clustering system of FIG. 1.

With continuing reference to FIG. 1 and with further reference to FIG. 2, a clustering method suitably performed by the illustrative clustering system of FIG. 1 is described. In an initial process operation 40, the dimensions selection sub-system is optionally invoked to select the N dimensions to be used for the clustering from a larger set of dimensions characterizing the items 22 to be clustered. If the items 22 are characterized by a large number of dimensions, it may be advantageous to not use the less relevant dimensions in the clustering. In a manual approach, the user can manually select or unselect one or more dimensions. In other embodiments, the dimensions selection sub-system is invoked to perform dimension selection automatically. For example, a Principal Component Analysis (PCA) can be used to reduce the dimensionality of items 22 in a linear fashion. The PCA approach ranks the dimensions by the eigenvalues of a covariance matrix (or by their "spread" in the initial data after a linear transformation) and allows one to select the top-ranked dimensions. In another approach, the Fisher Discriminant Analysis (FDA) can be used to reduce the dimensions in a linear fashion. In another approach, non-linear, entropy-based interactions between dimensions and class labels can be used to rank dimensions. Other dimension selection techniques can also be used. If there are some initial group labels annotated to the representation of items 22, then the FDA or other dimension reduction algorithm can optionally make use of such groupings in selecting the N dimensions.

In a visual operation 42, the visual mapping sub-system is invoked to display an N-dimensional to two- or three-dimensional mapping of items 22 to be clustered. In FIG. 2, a star coordinates mapping is illustrated in the inset of diagrammatically shown operation 42 for a single item $P(x_1, x_2, x_3, x_4, x_5, x_6)$ (where in this example N=6) that is mapped to the two-dimensional star coordinate position $Q(x,y)$. For clustering, there will in general be many items, and hence many points Q in the star coordinates visual mapping. Moreover, the vectors that are added together in the two-dimensional mapping space to map $P(x_1, x_2, x_3, x_4, x_5, x_6)$ to $Q(x,y)$ are shown in the inset of diagrammatically shown operation 42 for illustrative purposes, but are typically not shown in the interactive visual (e.g., star coordinates) mapping of the items 22. The illustrative star coordinate mapping for a point P having N dimensions to a point $Q(x,y)$ in the star coordinates space is given by:

$$Q(x, y) = \left( \frac{1}{N} \cdot \sum_{i=1}^{N} \alpha_i \cdot x_{ip} \cdot \cos(\theta_i), \frac{1}{N} \cdot \sum_{i=1}^{N} \alpha_i \cdot x_{ip} \cdot \sin(\theta_i) \right), \quad (1)$$

where $\theta_i$ and $\alpha_i$ are the star coordinates mapping parameters for the i-th dimension, N is the number of dimensions, and $x_{ip}$ is the value of the i-th dimension of the item P. Equation (1) assumes the center of the star coordinates space is at (0,0).

The mapping parameters 24 are typically initialized to suitable values. In some embodiments employing star coordinates, the initial values of the mapping parameters are $\alpha_i=1$ for all dimensions, and $\theta_i=360 \cdot (i-1)/N$ where dimensional index i runs from 1 . . . N and $\theta_i$ is in degrees. For example, if N=24 then initially $\theta_1=0°$, $\theta_2=15°$, . . . , $\theta_{24}=345°$. Other initializations are contemplated, including randomized initializations.

The human actor, i.e., the user, can review the graphically displayed N-dimensional to two- or three-dimensional mapping of items to be clustered shown by the operation 42. The user them makes a decision at operation 44 as to how to proceed.

In a first decision path 50, the user elects to perform one or more manual operations to move the clustering process forward. Here, the user employs the user interface sub-system to make one or more changes in an operation 52, such as a manual adjustment of one or more of the mapping parameters 24, selection of one or more of the mapping parameters 24 as fixed or adjustable, addition, deletion, or correction of group annotations for one or more of the items 22. In some embodiments, the user can manually adjust a mapping parameter regardless of whether it is set as fixed or adjustable. In such embodiments, the "fixed" setting affects only automated adjustments performed by the automated mapping parameter adjustment sub-system. In other embodiments, the user cannot manually adjust a fixed mapping parameter. By making manual adjustments of selected mapping parameters (that is, adjusting one or more of the θ and/or α parameters in the illustrative embodiment employing star coordinates visualization), the user can enhance or reduce the impact of certain dimensions on the mapping or cause certain dimensions to be aggregated together. Adjusting an α parameter produces a scaling transformation in the star coordinate mapping that allows the user to change the length of the corresponding dimensional axis, thus increasing or decreasing the contribution of the corresponding dimension on the star coordinates visualization. Adjusting a θ parameter produces a rotation transformation that modifies the direction of the dimensional axis in the star coordinates visualization, thus making the corresponding dimension more or less correlated with other dimensions. For example, when multiple dimensions are rotated to point in about the same direction (that is, are assigned similar θ values), their contributions are effectively aggregated in the visualization. As a result, these transformations provide a restructuring of the items layout in the star coordinates visualization. Additionally, by adding group annotations to selected items, the user can mark the symbol corresponding to the item in the star coordinates mapping. The visual mapping sub-system displays the mapping with items represented by symbols that are coded by at least one of shape and color to indicate groups of items. This enables the user to follow the items of the group in subsequent α and θ transformations. This is useful for examining how clusters are redistributed under new parameters as a result of transformations. In some embodiments, the user interface sub-system enables receipt of a user inputted delineation of a point or portion of the two- or three-dimensional mapping that contains at least one item of the selected group of items. For example, the user may draw an encompassing loop around the points representing items to be added to a group.

In the illustrated first decision path 50, the user can also elect to perform a validation operation 54 to validate aspects of the clustering. For example, the user can compute a correlation calculation for items of a group to obtain a quantitative measure of similarity of the items. In some embodiments, the validation operation 54 is omitted.

Once the user has made the desired manual changes via the first decision path 50, the process returns to the graphical review operation 42 to provide an updated two- or three-dimensional visual mapping of the items 22. The user can again select the first decision path 50 to make further manual changes, and thus iteratively improve the mapping, identify, label, and validate groups.

The manual first path 50, operating alone, has the disadvantages of being labor-intensive and dependent upon the skill and effort of the human actor. Accordingly, the user is provided with a second decision path 60 that may be selected. The second decision path 60 is an automated path. The user interface sub-system is again invoked in an operation 62 to enable the user to update the designation of mapping parameters as fixed or adjustable. (In some embodiments, the operation 62 is omitted, and the manual decision path 50 is used to perform such updating). In an operation 64, the adjustment sub-system including adjustment sub-system software 36 is invoked to adjust the adjustable mapping parameters, but not the fixed mapping parameters, to improve a measure of distinctness of one or more labeled groups of items in the two- or three-dimensional mapping. In some embodiments, the automated adjustment operation 64 of the mapping parameters is an iterative process. The automated adjustment operation 64 does not involve user interaction except for the selection of fixed and adjustable mapping parameters as performed in previous selection operation 62. When the automated adjustment operation 64 is completed, the process returns to the graphical review operation 42 to provide an updated two- or three-dimensional visual mapping of the items 22 with the modifications to the mapping parameters made during the automated adjusting 64 in place. The user can then select the manual first decision path 50 to make further changes manually if the user is not fully satisfied with the results of the automated adjusting. Additionally or alternatively, the user can again select the automated second decision path 60 to start another automated adjustment, perhaps with a different selection of fixed and adjustable mapping parameters.

In this manner, the user can iteratively perform clustering, alternating between the manual adjustments via the first decision path 50 and the automated adjustments via the second decision path 60 as deemed appropriate. This approach is a substantial improvement over existing automated clustering techniques which limit or eliminate user intervention, and manual interactive visual clustering techniques that are labor intensive and depend heavily upon the skill and expertise of the user. The approach of FIGS. 1 and 2 provides the advantages in terms of speed and ease of use of automated methods via the automated path 60. At the same time, the deficiencies of automated clustering are overcome through the manual path 50 which allows the user to limit the automated clustering by setting certain mapping parameters to be fixed, and to make additional manual adjustments as the user sees appropriate.

The advantages of the approach of FIGS. 1 and 2 can also be seen by comparison with manual interactive visual clustering techniques, which suffer the deficiencies of being labor intensive and skill-dependent. By providing the automated path 60 in addition to the manual path 50, the labor intensiveness of the clustering is greatly reduced. The automated clustering can be used initially, with most or all of the mapping parameters left adjustable. This initial automated clustering is likely to reach a result that is substantially better than that achieved by the default initial mapping parameter values, or by randomized initialization of mapping parameter values, thus eliminating substantial trial and error that is typically involved in the early stages of manual clustering. The user can then employ the manual path 50 to adjust and improve this first-pass automated result. When the user becomes stuck and cannot identify further manual adjustments that are likely to improve the mapping, the user can again invoke the automated path 60, possibly this time with only one or a few mapping parameters left adjustable, to obtain assistance from the automated mapping to get the user unstuck. Thus, it is seen that the hybrid combination of interactive visual clustering via the path 50 and semi-automated clustering via the path 60 provides a synergy that produces more substantially more rapid and successful clustering than is achieved by either technique alone.

At each iteration, the graphical review operation 42 is repeated to update the visual mapping with the manually or automatically adjusted parameters, and to incorporate any new or updated group labeling input via the manual path 50, and the user is again presented with the decision request 44. The user makes decisions 50 to apply the manual or automated paths 50, 60 as appropriate until all items, or at least items of interest, have been assigned to groups that appear to be appropriate in the mapping and, optionally, that satisfy the validation criterion of the validation operation 54. Once the user is satisfied, the user selects an exit path 70 which causes the groupings to be stored in an operation 72, or causes other exit operations to be performed such as updating with the new groupings a search engine database, a hard disk index, or so forth.

Having described the illustrative clustering system of FIG. 1 and an illustrative method of using the clustering system as shown in FIG. 2, an illustrative process suitably performed by the automated mapping parameter adjustment sub-system is described. Advantageously, this adjustment is performed in, that is, operates in, the two- or three-dimensional mapping space, rather than in the higher dimensionality of the N-dimensional space of the items. Thus, the automated mapping parameter adjustment sub-system takes advantage of the dimensional reduction provided by the N-dimensional to two- or three-dimensional mapping performed by the mapping sub-system, again demonstrating substantial advantageous synergy between the interactive visual clustering and automated clustering aspects in the disclosed hybrid systems.

Figure 3:
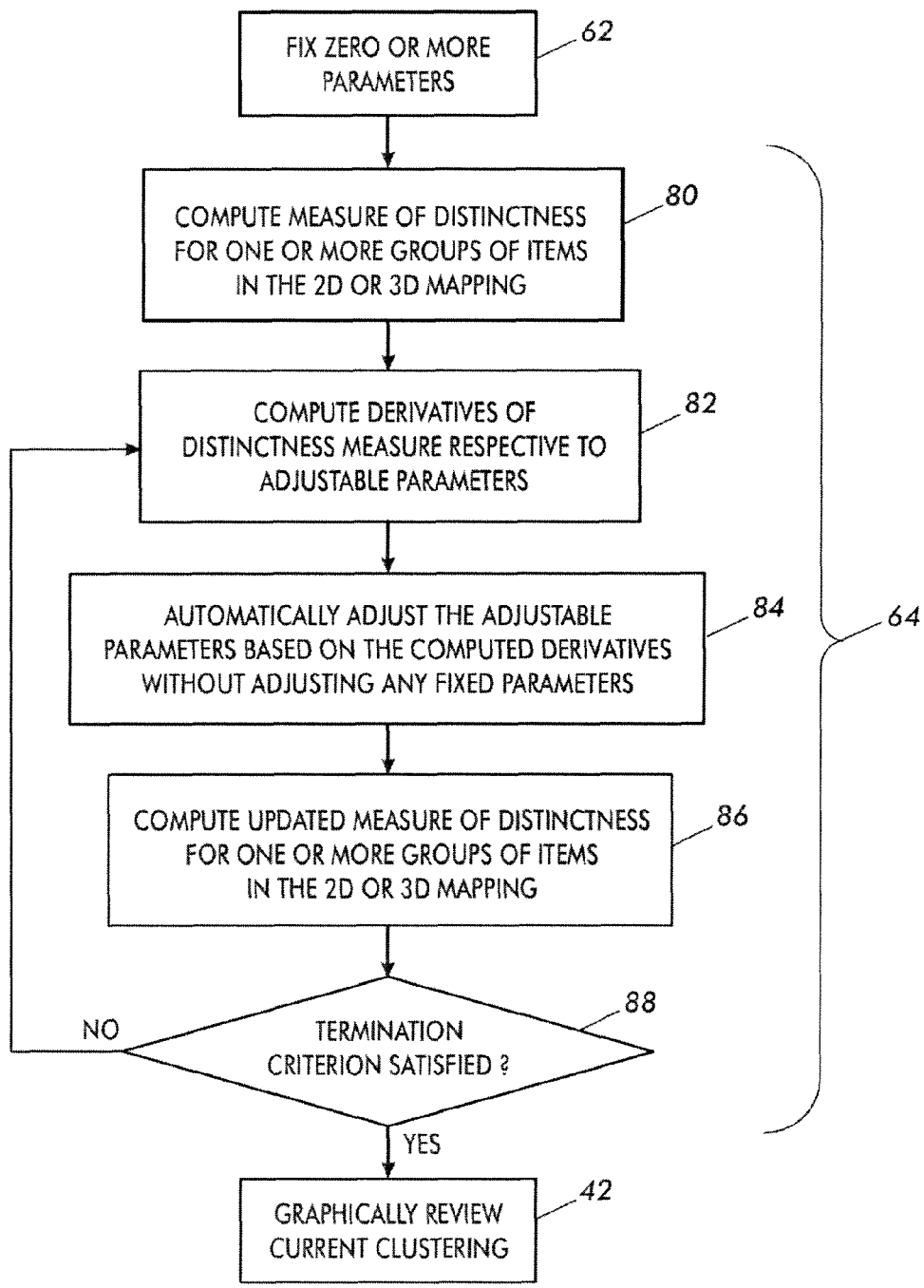
FIG. 3 diagrammatically shows an embodiment of the automatic adjustment component of the method of FIG. 2.

With reference to FIG. 3, in an operation 80 a measure of distinctness is computed for one or more groups of items in the two- or three-dimensional mapping. The measure of distinctness is computed based only on those items that have been associated with a group, for example by annotating the item or the representation of the item with the group label. The number of groups in some embodiments can be as small as one group. In some embodiments, the measure of distinctness incorporates a measure of similarity in the two- or three-dimensional mapping of items associated with the same group. Improvement corresponds to this measure of similarity showing increased similarity amongst the items of the same group with the automated adjustment. Additionally or alternatively, in some embodiments the measure of distinctness incorporates a measure of dissimilarity in the two- or three-dimensional mapping of items associated with different groups. Improvement here corresponds to this measure of dissimilarity showing increased dissimilarity between items of different groups with the automated adjustment. This dissimilarity measure is applicable when there are at least two different groups.

In the iterative approach illustrated in FIG. 3, partial derivatives of the measure of distinctness are also computed respective to each of the adjustable parameters in an operation 82. The partial derivatives are used in an adjustment operation 84 to automatically adjust the adjustable mapping parameters, such as the adjustable θ and α parameters in the case of star coordinate mapping, based on the computed derivatives, without adjusting any fixed mapping parameters such as the fixed θ and α parameters in the case of star coordinate mapping. The operation 84 can use various iterative adjustment algorithms such as the gradient descent method or a variant thereof, the Marquardt algorithm, or so forth. The output of the adjustment operation 84 is an adjusted value for one or more of the adjustable mapping parameters. In an operation 86, an updated measure of distinctness is computed for the one or more groups of items in the two- or three-dimensional mapping.

At a loop decision operation 88, it is determined whether the current iteration has satisfied a termination criterion for the iterative adjustment. A suitable termination criterion may include, for example, the improvement in the measure of distinctness achieved in the update operation 86 compared with the initial operation 80 or (in later iterations) compared with the measure of distinctness achieved in the update operation 86 of the previous iteration. Another suitable termination criterion may relate to the adjustment determined in the operation 84, with termination being appropriate where the largest percentage adjustment is below a threshold percentage for continued iterating. If the loop decision operation 88 determines that iterative improvement should continue, then flow transfers back to operation 82 to computed a new partial derivatives matrix. If the loop decision operation 88 determines that iterative improvement should terminate, then flow transfers back to the graphical review operation 42 of FIG. 2 to enable the user to review the adjusted mapping.

Having described a suitable iterative adjustment algorithm process flow with reference to FIG. 3, some illustrative operations and measures that may be used in such an iterative adjustment algorithm are now described. The algorithm of FIG. 3, as well as the illustrative operations and measures described next, are provided as illustrative examples, and other process flows, operations, and measures can also be used in performing the automated adjustment operation 64 in the two- or three-dimensional mapping space.

In the following illustrative operations and measures of distinctness, at least a small amount of group labeling is assumed to have been already performed. That is, at least some items of the items 22 to be grouped are assumed to be either labeled as being associated with a group, or labeled as having a certain probability of belonging to a labeled group. This group labeling data typically comes from one or more previous iterations through the manual path 50, although in some embodiments the representation of items 22 as initially input may include group labeling information.

In one approach, an optimal projection distance metric for the star coordinates θ and α can be obtained by using canonical variates which are the generalization of the Fisher Discriminant Analysis (FDA) to more than 2 classes and 1 projected dimension. The canonical variates for the two-dimensional projection can be obtained as follows. For each class the covariance matrix Sk and mean $\mu_k$ are formed. The weighted covariance matrix S is defined as follows:

$$S = \sum_{k=1}^{c} N_k \cdot S_k, \quad (2)$$

where $N_k$ is the number of data elements in class or group k, and c is the total number of class or groups under consideration. Using the mean μ of the dataset and $\mu_k$, the mean for each class k, the matrix $S_B$ is formed as follows:

$$S_B = \sum_{k=1}^{c} N_k \cdot (\mu_k - \mu) \cdot (\mu_k - \mu)^T. \quad (3)$$

To project into two-dimensional space, the optimal projection matrix W is formed with two first eigenvectors of $S^{-1}S_B$. Once the projection matrix $W=\{w_{ij}\}$ is obtained, where the index i=1, 2, and the index j=1, ..., N, the matrix equation $M^T=W$ is solved by the element-wise decomposition, in the form:

$$\begin{cases} \alpha_i \cdot \cos(\theta_i) = w_{i1} \\ \alpha_i \cdot \sin(\theta_i) = w_{i2} \end{cases} i = 1, \ldots, N. \quad (4)$$

If $w_{i1}$ and $w_{i2}$ are not both zero, then there exists a unique solution for $\theta_i$ and $\alpha_i$. In particular:

$$\theta_i = \arctan\left(\frac{w_{i2}}{w_{i1}}\right). \quad (5)$$

If $w_{i1}=0$ and $w_{i2}$ is not equal to zero, then $\theta_i$ is set to π/2. If $\theta_1=0$, the value of $\alpha_i$ is given as follows:

$$\alpha_i = \frac{w_{i2}}{\sin(\theta_i)}. \quad (6)$$

In other words, if the projection matrix W has no 0-rows, it corresponds to a unique set of θ0 and α for the star coordinate visualization. A disadvantage of this approach is that it operates in the N-dimensional space to compute the mapping parameters. As a result, obtaining eigenvectors for $S^{-1}S_B$ may be computationally expensive for a large set of dimensions, that is, large values of N. Also, it is noted that in this approach the adjusting is not iterative, but rather the adjusted values for the adjustable θ and α mapping parameters are computed non-iteratively to yield the improved projection distance metric which in this case serves as the measure of distinctness.

In another approach, which is iterative, a projection distance metric M is sought as the measure of distinctness that separates the data set in the two-dimensional star coordinates mapping space, rather than in the initial N-dimensional space. In the following approach, no assumption of Gaussian distribution is made. A distance metric is obtained from a set of similarity and dissimilarity pairs by optimizing a function that tries to reduce distances between similar items while increasing distances between dissimilar item pairs. A projection distance metric M is suitably defined as the distance between two items $x_1$, $x_2$ in the projected or mapped two dimensional star coordinates space as follows:

$$d_M(x_1,x_2)=\|x_1-x_2\|_M=\sqrt{(x_1-x_2)^T M^T M(x_1-x_2)} \quad (7).$$

In the following, a set of similarity pairs is defined as the set S, where each element of the set S is a pair of items associated with the same group. A set of dissimilarity pairs is also defined as the set D, where each element of the set D is a pair of items associated with different groups. In one approach, the projection distance metric M is formulated as an unconstrained optimization problem including a similarity measure based on the set S and a dissimilarity measure based on the set D. In this approach, a similarity measure is denoted as In(M), and is also referred to herein as an intra-group term In(M), and is given by:

$$In(M) = \sum_{(x_i, x_j) \in S} \|x_1 - x_2\|_M^2. \tag{8}$$

Analogously, a dissimilarity measure is denoted as Ex(M), and is also referred to herein as an inter-group term Ex(M), and is given by:

$$Ex(M) = \sum_{(x_i, x_j) \in D} \|x_1 - x_2\|_M^2. \tag{9}$$

The measure of distinctness, denoted for this example as J(M), is configured to be improved by reduction of the intra-group distance measure In(M) (that is, by increased similarity of items associated with the same group) or by increase of the inter-group distance measure Ex(M) (that is, by increased dissimilarity of items associated with different groups). Some illustrative measures of distinctness that can be constructed from the In(M) and Ex(M) similarity and dissimilarity distance terms include:

$$J(M) = In(M) - \frac{|S|}{|D|} Ex(M), \tag{10}$$

$$J(M) = In(M) - \frac{|S|}{|D|} \log(Ex(M)), \tag{11}$$

$$J(M) = In(M) - \frac{|S|}{|D| \cdot Ex(M)}, \tag{12}$$

$$J(M) = In(M) - \frac{In(M)}{Ex(M)}, \tag{13}$$

and so forth.

The measure of distinctness as set forth in any one of Equations (10)-(13) can be used as the measure of distinctness in the iterative adjustment method diagrammatically illustrated in FIG. 3. To do so, the partial derivatives of J(M) are computed in the operation 82 respective to each of the adjustable mapping parameters. Both In(M) and Ex(M) have computable partial derivatives. To compute the partial derivatives for the intra-group difference term In(M), the matrix M is suitably represented as M={$m_{kl}$} where the index k=1,2 and the index l=1, ..., N. With this substitution, Equation (8) can be rewritten as:

$$In(M) = \sum_{n=1}^{N} \sum_{l=1}^{N} \sum_{k=1}^{2} \beta_{ln}^S m_{lk} m_{kn}, \tag{14}$$

where:

$$\beta_{ln}^S = \sum_{(x_i, x_j) \in S} (x_l^i - x_l^j)(x_n^i - x_n^j). \tag{15}$$

To get element-wise derivatives, the symmetry condition $\beta_{ln}^S = \beta_{nl}^S$ can be used to yield:

$$\frac{\partial In}{\partial m_{kl}} = 2 \cdot \sum_{n=1}^{N} \beta_{kn} m_{kn}, k = 1, 2, l = 1, \ldots, N. \tag{16}$$

Partial derivatives for Ex(M) are readily computed in analogous fashion. Thus, the iterative method of FIG. 3 can be used, with the gradient descent method or another minimization algorithm performed in operation 84, to find a local minimum for the measure of distinctness J(M) as set forth in any one of Equations (10)-(13) and hence to obtain improved values for the adjustable mapping parameters.

In a constrained optimization approach, the measure of distinctness is taken as the intra-group distance term In(M) alone, but constrained to require Ex(M) to be greater than or equal to unity, so as to ensure robustness. Thus, in this case the optimization minimizes In(M) subject to the constraint Ex(M)≧1.

As yet another illustrative example, a constrained optimization is performed using the measure of distinctness J(M) as set forth in Equation (10), but subject to the following constraint:

$$\text{ave}(|\sin(|\theta_i - \theta_j|)|) > T_{th} \tag{17},$$

where $T_{th}$ is a threshold between zero and one. This constraint excludes distributions of $\theta_i$ mapping parameters that tend to spread along a single dimension only.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium or storage media storing software including: visual mapping software executable to display an N-dimensional to two- or three-dimensional mapping of items to be clustered, where N is greater than three, the mapping having mapping parameters for the N dimensions;
   automated adjustment software configured to automatically adjust at least some mapping parameters to improve a measure of distinctness of one or more groups of items in the two- or three-dimensional mapping wherein at least one mapping parameter of the two- or three-dimensional mapping is designated as adjustable and any mapping parameter of the two- or three dimensional mapping that is not designated as adjustable is designated as fixed, the automated adjustment software being configured to automatically adjust those mapping parameters designated as adjustable without adjusting those mapping parameters designated as fixed; and
   user interface software executable to receive user inputted values for the mapping parameters, user inputted values selecting whether mapping parameters are fixed or adjustable and user inputted values defining the one or more groups of items.

2. The non-transitory storage medium or storage media as set forth in claim 1, wherein the user interface software is executable to receive a user inputted value defining a selected group of items wherein said user inputted value includes a delineation of a point or portion of the two- or three-dimensional mapping that contains at least one item of the selected group of items.

3. The non-transitory storage medium or storage media as set forth in claim 1, wherein the visual mapping software is selected from a group consisting of:
- star coordinates mapping software executable to display an N-dimensional to two-dimensional star coordinates mapping of items to be clustered,
- elliptic coordinates mapping software executable to display an N-dimensional to three-dimensional spherical coordinates mapping of items to be clustered, and
- star or elliptic coordinates mapping software executable to selectably display either an N-dimensional to two-dimensional star coordinates mapping or an N-dimensional to three-dimensional spherical coordinates mapping of items to be clustered.

4. The non-transitory storage medium or storage media as set forth in claim 1, wherein the automated adjustment software is executable to improve a measure of distinctness having one or more components including at least one of (i) a similarity measure component indicative of similarity of grouped items associated with the same group, and (ii) a dissimilarity measure component indicative of dissimilarity of grouped items associated with different groups.

5. A clustering system comprising:
- a visual mapping sub-system configured to display an N-dimensional to two- or three-dimensional mapping of items to be clustered, where N is greater than three, the mapping having mapping parameters for the N dimensions;
- a user interface sub-system configured to receive user inputted values for the mapping parameters, user inputted values selecting whether selected mapping parameters are fixed or adjustable, and user inputted values associating selected items with selected groups; and
- an adjustment sub-system operative with at least one mapping parameter selected as adjustable and any mapping parameter that is not selected as adjustable being fixed, the adjustment sub-system being configured to adjust the adjustable mapping parameters, without adjusting any fixed mapping parameters, to improve a measure of distinctness of one or more groups of items in the two- or three-dimensional mapping;
- wherein the visual mapping sub-system and the adjustment sub-system are implemented by a computer executing software.

6. The clustering system as set forth in claim 5, wherein the mapping sub-system comprises at least one of:
- a star coordinates mapping display sub-system configured to display an N-dimensional to two-dimensional mapping of items to be clustered, the mapping parameters comprising θ parameters specifying angular components of the N-dimensional to two-dimensional mapping and α parameters specifying scaling of translational components of the N-dimensional to two-dimensional mapping, and
- an elliptic coordinates mapping display sub-system configured to display an N-dimensional to three-dimensional mapping of items to be clustered, the mapping parameters comprising θ and φ parameters specifying angular components of the N-dimensional to three-dimensional mapping and α parameters specifying scaling of translational components of the N-dimensional to three-dimensional mapping.

7. The clustering system as set forth in claim 5, wherein the mapping sub-system displays the mapping with items represented by symbols that are coded by at least one of shape and color to indicate groups of items.

8. The clustering system as set forth in claim 5, wherein the adjustment sub-system is configured to improve a measure of distinctness of one or more groups of items comprising a measure of similarity in the two- or three-dimensional mapping of items associated with the same group.

9. The clustering system as set forth in claim 5, wherein the adjustment sub-system is configured to improve a measure of distinctness of one or more groups of items comprising a measure of dissimilarity in the two- or three-dimensional mapping of items associated with different groups.

10. The clustering system as set forth in claim 5, wherein the adjustment sub-system is configured to improve a measure of distinctness of one or more groups of items comprising a combination of (i) a measure of similarity in the two- or three-dimensional mapping of items associated with the same group and (ii) a measure of dissimilarity in the two- or three-dimensional mapping of items associated with different groups.

11. The clustering system as set forth in claim 5, further comprising: a dimensions selection sub-system configured to select the N dimensions from a larger set of dimensions characterizing the items to be clustered;
- wherein the dimension selection sub-system is implemented by said computer executing software.

12. The clustering system as set forth in claim 11, wherein the dimensions selection sub-system employs one of principle component analysis (PCA) and Fisher discriminant analysis (FDA) to select the N dimensions from a larger set of dimensions characterizing the items to be clustered.

13. A clustering method comprising:
- displaying an N-dimensional to two- or three-dimensional mapping of items to be clustered, where N is greater than three;
- receiving user inputted values via a user interface for grouping selected items of the items to be clustered to define one or more groups of items;
- receiving user inputted values for the mapping parameters via the user interface, the user inputted values for the mapping parameters designating mapping parameters of the N-dimensional to two- or three-dimensional mapping as fixed or adjustable such that there is at least one fixed mapping parameter and at least one adjustable mapping parameter;
- applying an automated adjustment algorithm to adjust the at least one adjustable mapping parameter while not adjusting the at least one fixed mapping parameter to improve a measure of distinctness of the one or more groups of items in the two- or three-dimensional mapping; and
- displaying an updated N-dimensional to two- or three-dimensional mapping of items to be clustered using the adjusted mapping parameters.

14. The clustering method as set forth in claim 13, wherein the applying of an automated adjustment algorithm comprises:
- computing the measure of distinctness;
- determining an adjustment of at least one mapping parameter that improves the measure of distinctness; and
- iteratively repeating the computing and determining to improve the measure of distinctness.

15. The clustering method as set forth in claim 14, wherein the measure of distinctness of the one or more groups of items includes a similarity component indicative of statistical similarity in the two- or three-dimensional mapping of pairs of items that are associated with the same group.

16. The clustering method as set forth in claim 14, wherein the measure of distinctness of the one or more groups of items includes a dissimilarity component indicative of statistical dissimilarity in the two- or three-dimensional mapping of pairs of items that are associated with different groups.

17. The clustering method as set forth in claim 13, further comprising:

selecting the N dimensions from a larger set of dimensions characterizing the items to be clustered.

18. The clustering method as set forth in claim 13, wherein the receiving user inputted values via the user interface for grouping comprises:

selecting one or more items belonging to a selected group of the items by receiving user inputted values via the user interface that delineate a point or portion of the two- or three-dimensional mapping that contains said one or more items.

* * * * *